United States Patent [19]

O'Brien

[11] Patent Number: 5,664,432

[45] Date of Patent: Sep. 9, 1997

[54] VEHICLE AIR CONDITIONING CONDENSER

[75] Inventor: Stephen W. O'Brien, Burleson, Tex.

[73] Assignee: Tripac International, Inc., Ft. Worth, Tex.

[21] Appl. No.: 565,175

[22] Filed: Nov. 30, 1995

Related U.S. Application Data

[63] Continuation-in-part of Ser. No. 371,398, Jan. 11, 1995, Pat. No. 5,509,276, which is a continuation of Ser. No. 36,395, Mar. 24, 1993, Pat. No. 5,456,089.

[51] Int. Cl.$^6$ .................................................. F25D 23/00
[52] U.S. Cl. .................................................. 62/298; 285/212
[58] Field of Search .................... 62/298, 299; 285/211, 285/212; 165/76

[56] References Cited

U.S. PATENT DOCUMENTS

| | | |
|---|---|---|
| 4,707,999 | 11/1987 | Ohta et al. . |
| 4,920,766 | 5/1990 | Yamamoto et al. . |
| 5,095,716 | 3/1992 | You . |
| 5,146,766 | 9/1992 | Martins . |
| 5,163,716 | 11/1992 | Bolton et al. . |
| 5,169,178 | 12/1992 | Hunzinger . |
| 5,183,103 | 2/1993 | Tokutake . |
| 5,205,354 | 4/1993 | Lesage . |
| 5,515,696 | 5/1996 | Hutchison ............... 62/298 X |
| 5,516,156 | 5/1996 | Williamson ............... 285/212 |

FOREIGN PATENT DOCUMENTS

| | | | |
|---|---|---|---|
| 1191392 | 10/1959 | France .................. 285/212 |
| 2043273 | 3/1972 | Germany ................ 285/211 |
| 1-289714(A) | 5/1988 | Japan . |

OTHER PUBLICATIONS

Tripac Multifit Superflo Condensers, Jan., 1993.
Tripac Multifit Superflo Condensers—Refrigerant 134A.

*Primary Examiner*—Harry B. Tanner
*Attorney, Agent, or Firm*—Harold E. Meier

[57] ABSTRACT

A vehicle air conditioning condenser includes two tubular members, one on each end of the condenser, for conducting refrigerant to the cooling tubes. A connector block, having a half cylindrical indentation extending from the top of the block to the bottom of the block, is affixed to one of the tubular members of the condenser. The internal radius of curvature of the half cylindrical indentation is substantially the same as the external radius of curvature of the tubular member of the condenser to which the tubular block is attached. The connector block contains a circular first opening of predetermined size with female threads for receiving and securing a connector fitting. Refrigerant passes from an inlet tube assembly, through the connector fitting, into the connector block, through a tubular passage way, into the tubular member and into the cooling tubes.

2 Claims, 3 Drawing Sheets

VEHICLE AIR CONDITIONING CONDENSER

RELATED APPLICATION

This application is a continuation-in-part of pending application Ser. No. 08/371,398 filed Jan. 11, 1995, U.S. Pat. No. 5,509,276, which is a continuation of application Ser. No. 08/036,395 filed Mar. 24, 1993, U.S. Pat. No. 5,456,089.

TECHNICAL FIELD

The present invention relates to a vehicle air conditioning condenser in general and, in particular, a universal tubing connector for a vehicle air conditioning condenser.

BACKGROUND OF THE INVENTION

In the automotive air conditioning aftermarket business, most air conditioning systems are presently custom built for each particular make and model of automobile. The systems include a custom built condenser and custom built brackets for supporting the condenser in the engine well. The tubes which carry the refrigerant to and from the condenser are presently manufactured and attached in the specific length and shape necessary to assemble the custom built air conditioning system. Because each make and model of automobile requires a different specifically designed and shaped air conditioning assembly, automotive air conditioning suppliers in the aftermarket are forced to maintain, at significant cost, extensive inventories of custom built condensers, mounting brackets and tube assemblies.

The tube assembly carrying a refrigerant in an air conditioning system must be securely fastened to the condenser or heat exchanger for proper operation. It is desirable that any connector should reduce tube assembly costs and allow for a flexible installation.

In a conventional installation, the conventional tube assembly is usually secured to the condenser by a nut type fastener or through the use of a pad or block which is secured by means of a bolt. The problem with using a nut type fastener or a bolted block is controlling the tightening of the nut and the positioning of the tube during installation. If the nut or bolt is over-torqued, there is a risk that the condenser may be damaged through distortion. If the nut or bolt is under-torqued, there is a risk of refrigerant loss with the associated environmental concerns or of incorrectly positioning the tube leading to a possible fracture of the tube.

To alleviate these problems, several components of a vehicle air conditioning system are described in co-pending applications titled: "UNIVERSAL CONDENSER FOR AIR CONDITIONING SYSTEM", application Ser. No. 08/036,395, filed Mar. 24, 1993, and application Ser. No. 08/371,398, filed Jan. 11, 1995; and co-pending application titled "UNIVERSAL MOUNTING BRACKET," application Ser. No. 08/479,618, filed Jun. 7, 1995; in addition to U.S. Pat. No. 5,271,460 titled "TUBE FASTENER." The present invention may be used in conjunction with the aforementioned universal condenser and universal mounting bracket such that the characteristics of a custom built system will be duplicated.

SUMMARY OF THE INVENTION

The present invention is a vehicle air conditioner condenser having a universal tubing connector ("universal connector") for securing a refrigerant tube assembly to the vehicle air conditioning condenser. The connector allows for a reduction in inventory, is easy to install, and provides an environmentally adequate seal between the tube assembly and the condenser.

The condenser includes two tubular members, one on each end of the condenser, for conducting refrigerant to the cooling tubes. A connector block is affixed to the tubular member of the condenser. The connector block receives a connector fitting that is connected to the refrigerant tube assembly. Each connector block comprises a rectangular block having a top, bottom and sides. A half cylindrical indentation extends from the top of the block to the bottom of the block and is located on the back side of the block. The internal radius of curvature of the half cylindrical indentation is substantially the same as the external radius of curvature of the tubular member of the condenser to which the tubular block is attached. The connector block contains a circular first opening of predetermined size with female threads for receiving and securing the connector fitting. The first opening may be located on the top or bottom or on any of the remaining three sides of the block.

Each connector block further includes a second opening in the back side that is connected by an internal passage in the block to the first opening. The second opening of the connector block is located adjacent to a first opening on the tubular member of the condenser, whereby the refrigerant passes from the inlet refrigerant tube through the connector fitting, through the connector block into the tubular sides of the condenser.

The universal tubing fastener makes field installation of the condenser easy and environmentally safe because an adequate seal is achieved between the inlet and outlet refrigerant tube assemblies and the condenser.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE INVENTION

Figures 1, 2:
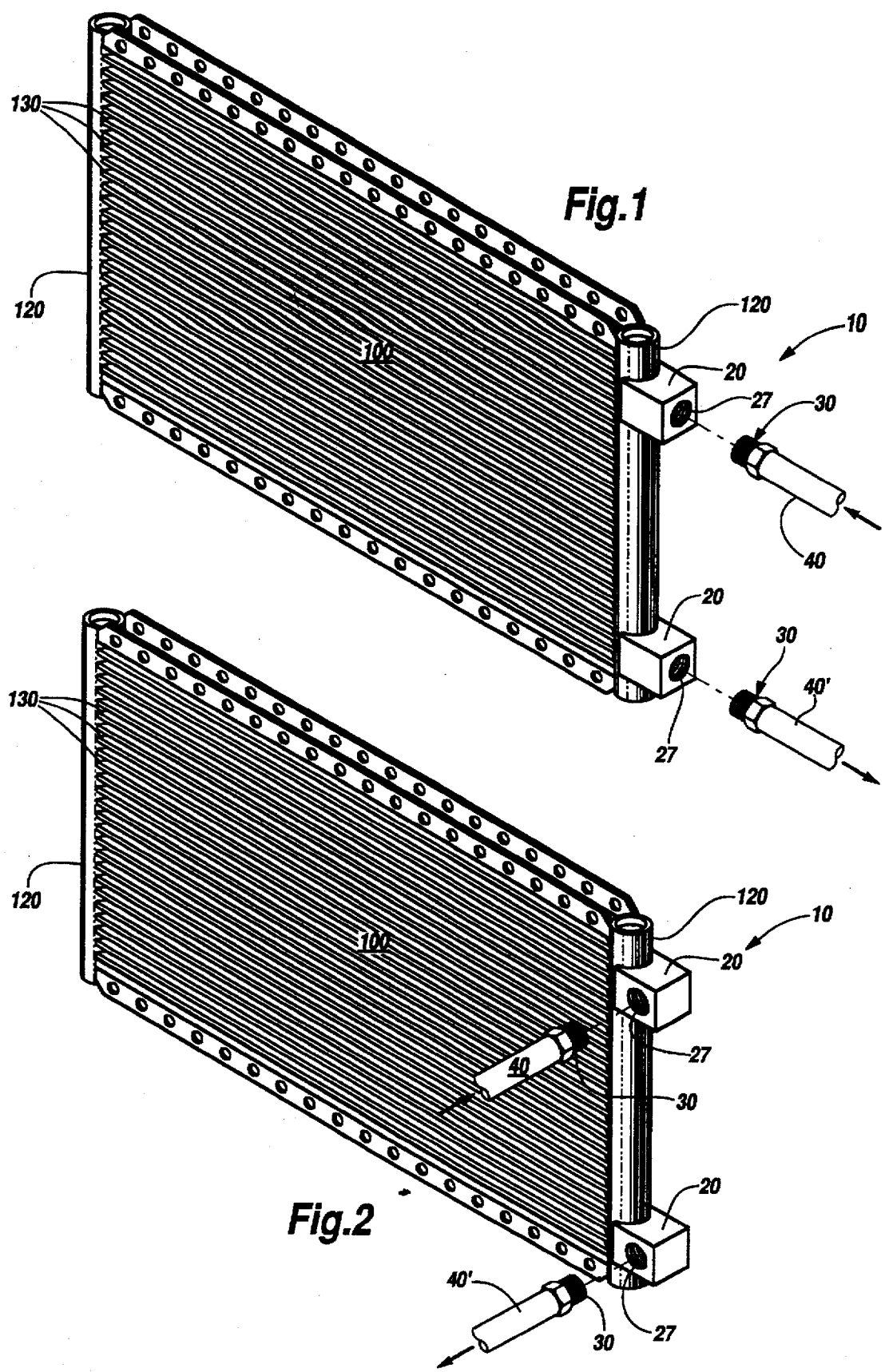
FIG. 1 is a perspective view illustrating a first embodiment of a universal tubing connector.
FIG. 2 is a perspective view illustrating a second embodiment of the universal tubing connector.

Referring now to the Drawings, the elements of the present invention are numbered consistently in all of the FIGURES, and any reference to an element in the following description refers to that element in all of the FIGURES.

The present invention is a universal tubing connector ("universal connector") 10 for securing an inlet refrigerant tube assembly 40 and an outlet refrigerant tube assembly 40' to a single or double pass vehicle air conditioning condenser 100. The condenser 100 includes two tubular members 120, one on each end of the condenser, for conducting refrigerant to the cooling tubes 130. The present invention comprises a connector block 20 attached to the tubular members 120 of the condenser 100 and a connector fitting 30 connected to the refrigerant tube assemblies 40 and 40'.

Figure 3:
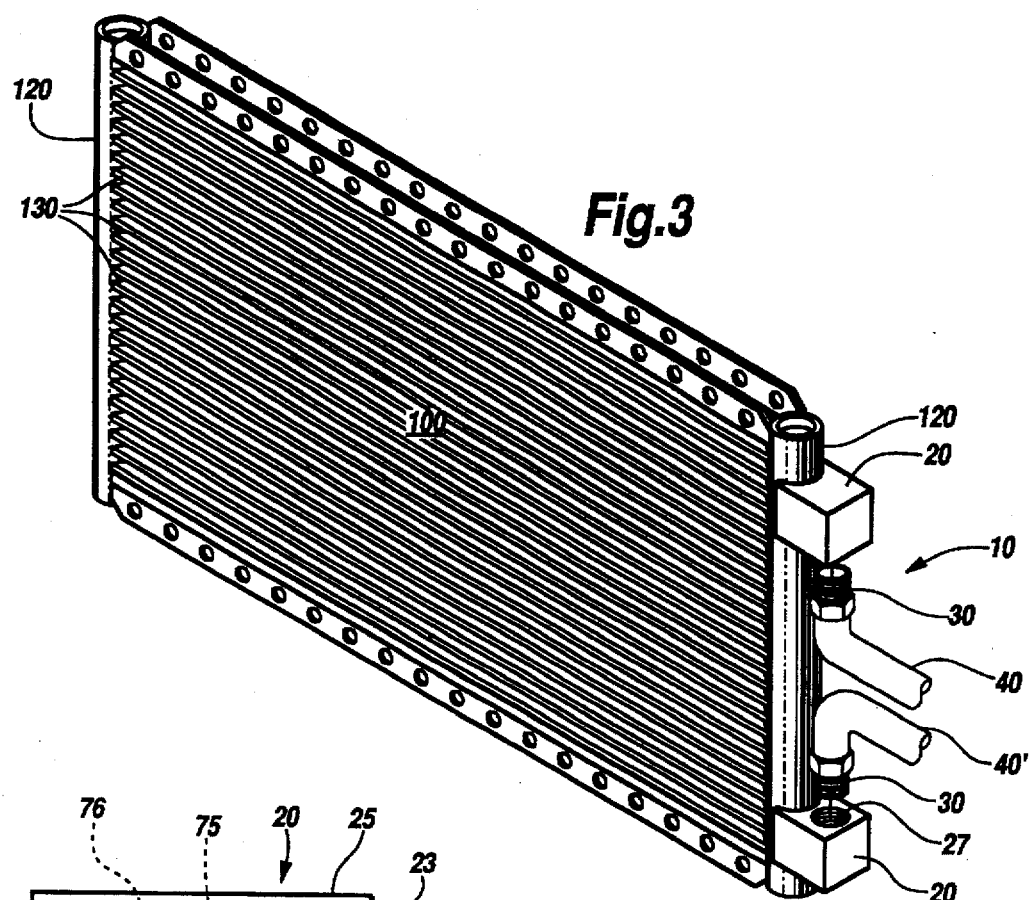
FIG. 3 is a perspective view illustrating a third embodiment of the universal tubing connector.

Referring to FIGS. 2 and 3, therein is illustrated second and third embodiments of the present invention. As shown in FIGS. 1, 2 and 3, the connector fitting 30 is connected to connector block 20 via a circular opening 27 that is positioned in either the front, side, top or bottom (not shown) of connector block 20.

Figure 4A:
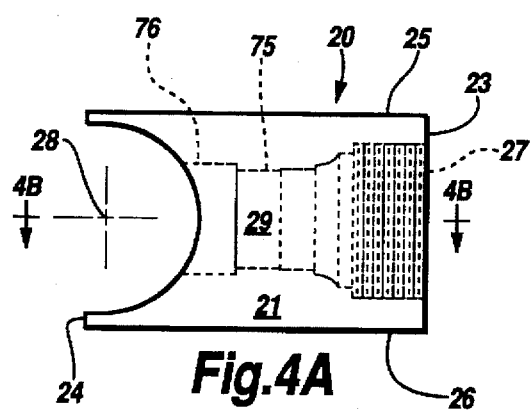
FIG. 4A is top view of a connector block of the present invention.
Figure 4B:
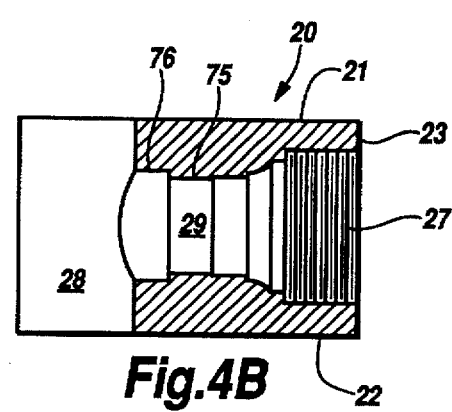
FIG. 4B is a section view of the connector block taken through section 4B—4B of FIG. 4A.

Referring now to FIGS. 4A and 4B, therein is shown in FIG. 4A a top view and FIG. 4B a side section view of connector block 20. Each connector block 20 comprises a generally rectangular block having a top 21, bottom 22, front side 23 facing away from the condenser, a back side 24 adjacent to the condenser, a right side 25 and left side 26. In the preferred embodiment, the connector block 20 is approximately cubic. However, the connector block 20 may be any number of possible shapes including rectangular and cylindrical. A half cylindrical indentation 28 located on the back side extends from the top 21 of connector block 20 to the bottom 22. The internal radius of curvature of the half cylinder indentation 28 is substantially the same as the external radius of curvature of the tubular member 120 of the condenser 100 to which it is attached.

Figure 4C:
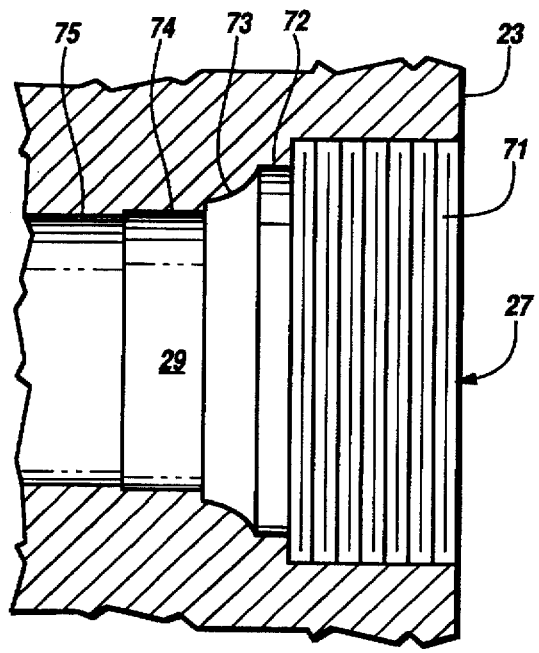
FIG. 4C is an enlarged partial section view of the connector block taken from FIG. 4B.
Figure 6:
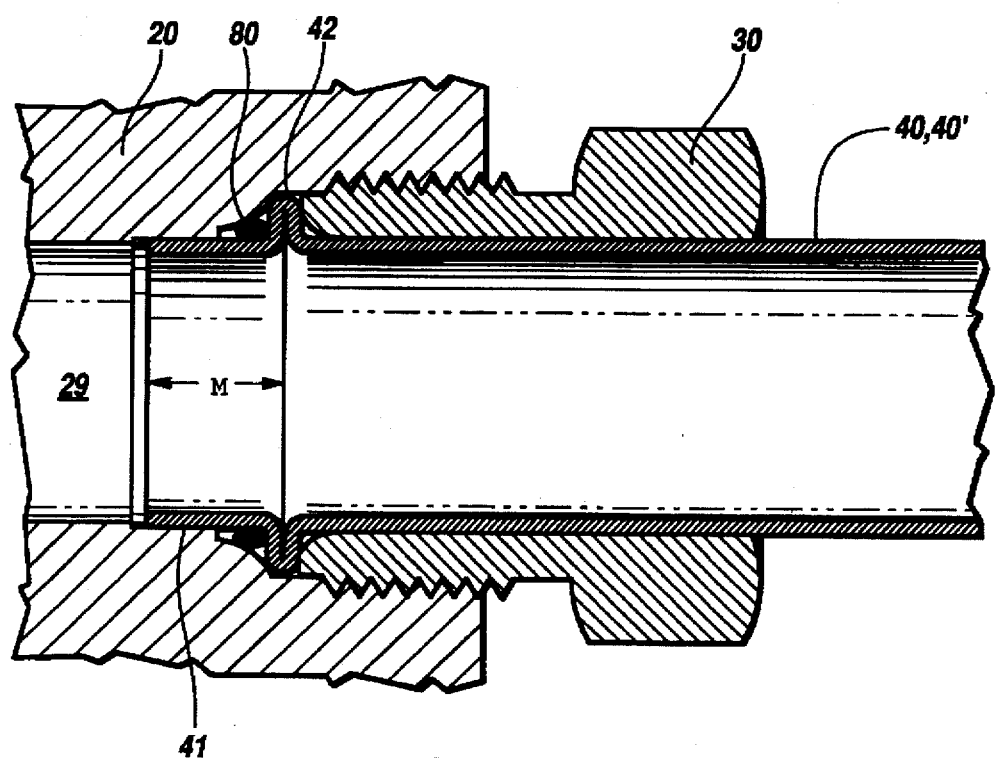
FIG. 6 is a partial cross section illustrating the connector fitting inserted in the connector block.

Referring to FIG. 4C and FIG. 6, extending into the connector block 20 from the front side 23 is a tubular passage way 29 that connects the opening 27 with the half cylindrical indentation 28 on the back side 24 of connector block 20. Tubular passage way 29 includes a first section 71 internally threaded and sized to receive threads on connector 30. A second section 72 has a tubular profile sized to receive a ridge 42 on refrigerant tube assembly 40 or 40'. Next, a third section 73, having a tapered profile, receives an "O-Ring" seal 80. A fourth section 74 also has a tubular profile and is sized to receive the end of refrigerant tube assembly 40 or 40'.

Returning now to FIGS. 4A and 4B, passage way 29 has a fifth section 75 and sixth section 76, both having tubular profiles, that are connected in sequence to each other and to the half cylindrical indentation 28 located on the back side of connector block 20. Connector block 20 is affixed to tubular member 120 such that circular indentation 28 is located adjacent to an opening in tubular member 120. Refrigerant passes from inlet tube assembly 40, through connector fitting 30, into connector block 20, through tubular passage way 29, into tubular member 120 and into cooling tubes 130.

In the embodiment shown in FIG. 1, the tubular passage way 29 is straight. However, in the embodiments illustrated in FIGS. 2 and 3, the tubular passage way 29 would incorporate a right angle turn in order to allow the opening 27 to be positioned in the top, bottom or sides of the connector block 20.

Figure 5:
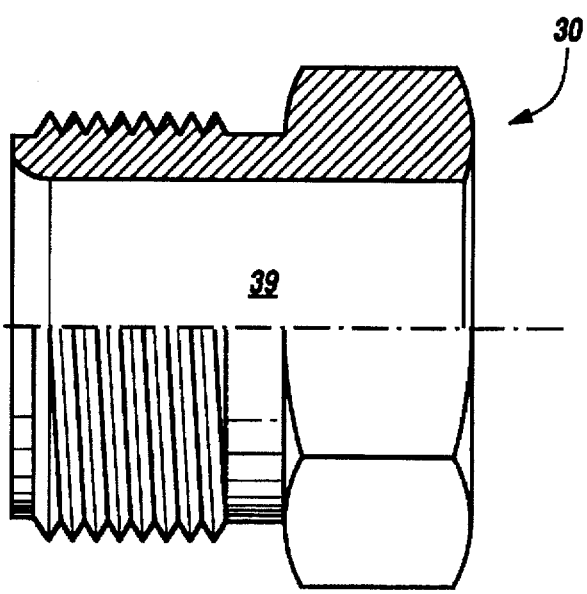
FIG. 5 is a cross section of a connector fitting of the present invention.

Referring to FIG. 5, there is illustrated a standard connector fitting 30 having an internal tubular passage way 39.

Returning to FIG. 6, connector fitting 30 slips over tube assembly 40 or 40'. Tube assemblies 40 and 40' are formed from conventional tubing that includes a ridge 42 located a predetermined distance M from the first end 41 of the tube. The ridge 42 may be formed integral with the tube or formed by a crimping tool. Distance M is sized to accommodate an "O-Ring" seal 80 located circumferentially on the first end 41 of tube assembly 40. Tube assembly 40' has a corresponding ridge 42' located as described for tube assembly 40.

The "O-Ring" seal 80 placed over the end of tube assembly 40 is compressed when the connector fitting 30 is inserted into the connector block 20 and tightened, providing an environmentally adequate seal between the condenser 100 and the refrigerant tubes 40 and 40'.

In the preferred embodiment, the connector block 20 is an aluminum alloy that is brazed onto the tubular member 120 of the condenser 100. This brazing operation may be done in an oven concurrently with brazing the cooling tubes to the tubular member 120. Connecting the connector block 20 to the tubular member 120 by brazing is preferable to a conventional welding operation because in a conventional welding operation care must be taken not to damage the tubular member 120. Additionally, when a conventional tube stub with a male threaded fastener is welded onto the tubular member 120, care must be taken to maintain the tubular inlet fitting in position during the welding process.

The present invention incorporates the further advantage that the connection is accomplished using internal threads in the connector block. These internal threads are not as susceptible to damage from extraneous objects during the brazing, handling, shipping and storage of the condenser as would a conventional connector with a tube stub and a male threaded fastener.

Although several embodiments of the invention have been illustrated in the accompanying Drawings and described in the foregoing Detailed Description, it will be understood that the invention is not limited to the embodiment disclosed but is capable of numerous modifications without departing from the scope of the invention as claimed.

I claim:

1. A vehicle air conditioning condenser comprising:

a plurality of cooling tubes;

a first and second tubular members, each connected to one end of the plurality of cooling tubes, said first tubular member having a first opening; and a connector block affixed to the first tubular member, said connector block including:

a half cylinder indentation having an internal radius of curvature substantially the same as the external radius of curvature of the first tubular member of the condenser, for receiving the first tubular member, a first opening for receiving a connector fitting located on a refrigerant tube, a second opening located adjacent to the first opening in the first tubular member, and an internal passage way connecting the first opening and second opening, said passage way including:

a first internally threaded portion located proximal to the first opening, said threaded portion for receiving the connector fitting, a second tubular portion for receiving a ridge on the refrigerant tube that passes through the connector fitting, said second portion located in the passage way between the first portion and the second opening in the connector block, a third tubular portion for receiving and mating with a terminal end of the refrigerant tube, said third portion located in the passage way between the second portion and the second opening in the connector block, and a substantially conical portion located between the second portion and the third portion for receiving a seal, the conical portion having a diameter on the end farthest from the first opening substantially equal to the diameter of the refrigerant tube, and wherein said conical portion, the refrigerant tube and the ridge of the refrigerant tube form a seal chamber to restrict a seal from sliding away from the ridge on the refrigerant tube when compressed in the seal chamber.

2. The vehicle air conditioning condenser of claim 1 wherein said passage way further includes:

a fourth tubular portion for receiving a truncated end of the refrigerant tube, said fourth portion located in the passage way between the third portion and the second opening in the connector block.

* * * * *